(12) United States Patent
Gomez

(10) Patent No.: US 7,601,313 B2
(45) Date of Patent: Oct. 13, 2009

(54) ACID/MICROWAVE LEACHING OF TITANIUM ORE AND THEN FLOTATION TO RECOVER TITANIUM OXIDE CONCENTRATE

(75) Inventor: Rodolfo Antonio M Gomez, Urrbrae (AU)

(73) Assignee: RMG Services Pty Ltd, Adelaide (AU)

( * ) Notice: Subject to any disclaimer, the term of this patent is extended or adjusted under 35 U.S.C. 154(b) by 935 days.

(21) Appl. No.: 10/492,057

(22) PCT Filed: Oct. 8, 2002

(86) PCT No.: PCT/AU02/01360

§ 371 (c)(1),
(2), (4) Date: Apr. 8, 2004

(87) PCT Pub. No.: WO03/031664

PCT Pub. Date: Apr. 17, 2003

(65) Prior Publication Data

US 2005/0025687 A1    Feb. 3, 2005

(30) Foreign Application Priority Data

Oct. 12, 2001 (AU) .................................. PR8203

(51) Int. Cl.
*C01G 23/047* (2006.01)
(52) U.S. Cl. .......................................... 423/82; 423/83
(58) Field of Classification Search .................... 423/82, 423/83
See application file for complete search history.

(56) References Cited

U.S. PATENT DOCUMENTS

| | | | |
|---|---|---|---|
| 3,457,037 A | | 7/1969 | Aramendia et al. |
| 3,803,287 A | * | 4/1974 | Fukushima et al. ........... 423/74 |
| 3,922,164 A | | 11/1975 | Reid et al. |
| 4,097,574 A | | 6/1978 | Auger et al. |

FOREIGN PATENT DOCUMENTS

WO    WO96/24555    8/1996

* cited by examiner

Primary Examiner—Steven Bos
(74) Attorney, Agent, or Firm—Klauber & Jackson

(57) ABSTRACT

A process of producing 99% plus titanium dioxide product by using conventional and microwave heating and leaching of the titanium compound feedstock using acid and oxidants. The solid residue from the leaching is used to produce the high quality titanium oxide by froth flotation. Hydrochloric acid can be recovered by multi-stage evaporation. The process can be modified to produce nano-size titanium dioxide product.

24 Claims, 3 Drawing Sheets

ACID/MICROWAVE LEACHING OF TITANIUM ORE AND THEN FLOTATION TO RECOVER TITANIUM OXIDE CONCENTRATE

FIELD OF INVENTION

This invention is a process to recover high purity titanium oxide from a wide range of titanium compounds including rutile ores and sands, ilmenite ores and sands, and by-products of other titanium oxide processes and metallurgical processes. This process is simple, lower capital and operating cost, and environmentally acceptable than existing titanium oxide processes.

INTRODUCTION

Our company has been successful in developing a process to extract nickel and cobalt from their compounds using microwaves during the leaching process (U.S. Pat. No. 5,665,015, Mar. 16, 1994). This knowledge has been used to develop a process for the extraction of titanium oxide and by-products from their compounds. The process covered by this patent application is based on about 60 tests using our 3-litre microwave powered reactor on samples of gravity concentrate rutile ore and titanium oxide tailings.

PRIOR ART

The most popular method of up-grading titanium oxide compounds is a fluidized dissolution of the titanium oxide material using chlorine in a fluidized bed. The titanium chloride formed is reduced to titanium oxide and the chlorine is recycled to the fluid bed roaster. Aside from the environmental consideration, this process is sensitive to the particle size of the feed so that fines of less than 150 mesh are not acceptable. Further, this process is sensitive to material such as magnesium and calcium oxides which would deteriorate the quality of the fluid bed. The residue from this chlorination process also contains substantial amounts of titanium oxide.

There are existing processes where the titanium oxide compound is subjected to roasting for up-grading of the titanium oxide or roasting followed by leaching and recovery of the acid used by pyrolysis. The roasting of ilmenite to produce a 92.5% titanium oxide product is a commercial process of Tiwest in a plant that has operated for several decades in Western Australia.

The leaching of ilmenite with or without prior roasting is described in several US patents. U.S. Pat. No. 3,457,037 (Jul. 22, 1969) describes a process where the ilmenite is roasted in a reducing atmosphere and then leached with a mineral acid to dissolve components such as iron and magnesium. U.S. Pat. No. 3,922,164 (Nov. 25, 1975) describes the up-grading of ilmenite by leaching with hydrochloric acid and a soluble chloride such as ferrous chloride, manganese chloride, magnesium chloride, calcium chloride, and ammonium chloride. Synthetic rutile is produced from ilmenite by pre-oxidation and reducing roast followed by leaching air and optionally acid and drying is described in U.S. Pat. No. 4,097,574 (Jan. 27, 1978)

A recent process is described in BHP Minerals International application PCT/US96/00897 (Jan. 22, 1996) where the ilmenite is subjected to a 2-stage leach with strong hydrochloric acid at 25 to 80 C to dissolve the titanium oxide. After removing the iron as a chloride by cooling the solution to about 15 C, titanium oxide is precipitated as a fine and highly pure titanium oxide by hydrolysis at a temperature in excess of 75 C. This proposed process has not been successfully commercialized to date.

Total dissolution of the ilmenite requires aggressive leaching conditions such as high pressure and temperature that increases the capital and operating cost of the process. Further, based on our tests, it is difficult to dissolve the titanium compound completely. The presence of impurities such as iron, aluminum, calcium and magnesium interfere with the production of the desired pure titanium oxide.

DESCRIPTION OF THE INVENTION

A successful ilmenite process must be friendly to the environment, low capital and operating cost, and produce acceptable by-products.

The titanium oxide compound such as an ilmenite or rutile ore, may require some conventional treatment such as crushing, grinding, flotation or magnetic separation or electrostatic separation before the up-graded material is presented as feed to this process.

In one form therefore the invention is said to reside in a process for extracting and producing high-grade titanium oxide from titanium compounds consisting of the following steps;

leaching a leach slurry comprising the titanium oxide compound with acid and oxidant using conventional and microwave energy to produce a solid leach residue and a liquid leach residue;

subjecting the solid leach residue to flotation to recover a high grade titanium oxide concentrate; and processing the liquid leach residue to recover the acid.

In a further form the invention may be said to reside in a process for producing highly pure nano-size titanium oxide from titanium compounds consisting of the following steps leaching of the fine titanium compound feedstock with acids and oxidants using conventional energy and high temperature microwave energy;

subjecting the leach residue to liquid-solid separation; and subjecting the clarified leach liquid to hydrolysis to produce nano-size titanium oxide.

Hence in one form therefore the invention consists of the following major steps:
1. Leaching of the titanium compound with an inorganic acid such as hydrochloric or sulfuric acid using conventional and microwave energy.
2. Separation of solid and liquid leach residue.
3. Froth flotation recovery of the titanium oxide from the solid leach residue.
4. Recovery of the acid such as hydrochloric acid and the iron oxide/chloride and other oxides/chlorides by evaporation and low temperature control.

In a further form the invention consists of the following major steps:
1. Leaching of the titanium compound at higher temperatures with an inorganic acid such as hydrochloric or sulfuric acid using conventional and microwave energy.
2. Separation of solid and liquid leach residue.
3. Recovery of titanium oxide by hydrolysis from the liquid leach residue.
4. Recovery of the acid from the liquid leach residue by evaporation and low temperature control.

The high purity titanium oxide in excess of 99% purity may be subjected to calcining, grinding and screening to meet market specifications for paint pigment grade, smelter feed, and other applications of titanium oxide.

Lower cost conventional methods are used to up-grade the feed to the process of this invention for optimum results in terms of product quality and cost. Such conventional methods may include crushing and grinding, gravity concentration by spiral concentrators, tables, or jigs; dry or wet magnetic concentration; and by froth flotation. The original material containing the titanium dioxide may be an ore, a heavy mineral sand, or a by-product of a process such as a slag. The material is generally pre-concentrated to about 35% iron and 35% titanium where the mineral is ilmenite and to about 65% titanium dioxide where the material is from rutile ore.

Some titanium material may require roasting but this expensive step is generally not necessary before the feed material is applied to this process.

Leaching

A pre-leach may be carried out if the titanium compound contains significant content of vanadium or other valuable base metals. Segregation roasting in reducing or oxidizing atmosphere may be required for efficient recovery of the vanadium. A small quantity of other oxidant such as hydrogen peroxide may be added to the weak acid solution for the extraction of the vanadium. The extraction of precious metals may be carried out on the residue of the main titanium oxide leach. Leaching with cyanide solution or electro-leaching is carried out on the leach residue if platinum or gold is to be recovered.

The feed material to the process may be dry or wet but needs to be fine, preferably about minus 20 to 30 microns for an efficient leaching process. Acid such as sulfuric acid of about 30 to 60% by weight or hydrochloric acid of about 10 to 30% may be used for leaching. This may consist of new acid and re-cycled acid. Cost may decide which acid to use but technically, sulfuric acid may be used where the material contains 5 to 20% iron and hydrochloric acid is used in material containing more than 20% iron.

Preferably the leaching is done as counter-current leaching carried out in two or more stages. Conventional heating may be used initially to dissolve readily leachable materials followed by the application of microwave energy. Leaching temperature in the leaching tanks is maintained about 110 C to allow low cost plastic tanks and pipes such as fiber glass or polypropylene to be used. A higher temperature may be used where microwave energy is applied in a series of pipes. The leach slurry exiting the pipes may be cooled before the pressure is released through the pressure control valve and the wet cyclone.

The intent of the leaching step is to dissolve materials such as oxides of iron, calcium. magnesium, aluminum, and others. Major materials that remain un-dissolved include silica, chromite, zircon, and titanium oxide.

A small amount of titanium may dissolve but this small amount is not a problem particularly if the leach liquid is re-cycled.

Liquid-Solid Separation

The leach slurry is subjected to a multi-stage wet-cyclone or liquid vortex separation. The solids are passed to a filter for removal of more liquid and washing on the filter.

The filter may be a disc, drum, pan, or belt filter. The washed solids are transferred to the flotation concentration step while the liquid is stored in the weak acid storage.

The liquid leach solution is stored prior to the acid recovery step.

Froth Flotation Up-Grading of Titanium Oxide

The leach solid residue is re-pulped in recycled flotation liquid. The pH is adjusted to between 8 and 10 with soda ash or lime. Frothers such as pine oil and collectors such as oleic acid are mixed with the slurry. Roughing and cleaning flotation is applied to the slurry. A high grade titanium oxide is recovered at high recovery in the flotation up-grading.

Tests have been carried out on a gravity concentrate of a South American low-grade rutile ore using a 3-litre reactor powered by a 1.2 kilowatts microwave generator and electrical heating coils to provide conventional heating. Sulfuric acid was used in these tests due to the low iron content. The results of the test are shown in Table 1.

TABLE 1

Test Results on Rutile Ore

| Product | Wt.-grams | $TiO_2$ % ppm | Distribution % |
|---|---|---|---|
| Leaching | | | |
| Leach Residue | 248.92 | 61.2 | 95.15 |
| First Leach Product | 2.70 | 13.3 | 0.23 |
| Second Leach Liquid | 3,400 | 2,177 ppm | 4.62 |
| Calculated Head | 297.2 | 52.5 | 100.00 |
| Flotation | | | |
| Cleaner Concentrate | 74.30 | 99.2 | 97.2 |
| Cleaner Tailings | 7.03 | 14.7 | 1.4 |
| Rougher Tailings | 42.62 | 2.57 | 1.4 |
| Calculated Head | 123.95 | 61.2 | 100.00 |

Without the leaching step for this rutile ore, the best grade achieved by a research group in Canada is 89.2 percent $TiO_2$. This grade of titanium dioxide is not saleable.

The flotation up-grading of this process may be used to up-grade leach residues from other processes such as the Tiwest process of reduction roasting of ilmenite and leaching with ammonium chloride.

The total recovery of titanium dioxide from the up-graded gravity concentrate feed is about 92.5 percent. The high grade titanium oxide flotation concentrate may further be treated by calcining, size reduction by vortex grinding, and screening to separate fractions for sale as paint pigment feed, smelter feed, welding rod coating, and other industrial and pharmaceutical uses.

Residue from the flotation concentration contains substances such as silica, chromite, zircon, and thorium. The chromite can be recovered by magnetic separation while the zircon and other heavy minerals may be recovered by gravity separation methods.

Recovery of Acid and By-Products

The usual method of recovering acid is by pyrolysis and this may be used in this process if sulfuric acid is used but the preferred method of this process is by evaporation where the acid used is hydrochloric acid because hydrochloric acid is volatile.

Laboratory test on liquid leach residue showed that hydrochloric acid can be removed from the leach liquor residue by evaporation. Evaporation may be carried out in a multi-stage operation. The evaporated acid may be recovered by condensation for re-cycle to the process.

Laboratory test also showed that as the hydrochloric acid is removed, oxides/chlorides of iron, magnesium, aluminum, and calcium are precipitated. Laboratory tests also showed that some degree of separation of these oxides/chlorides may be achieved by cooling the residue of evaporation at different temperatures down to about minus 10 C.

The liquid leach residue may also be subjected to cyanide or electro-leaching to recover precious metals such as platinum.

Where the acid is sulfuric acid, the sulfuric acid may be recovered by pyrolysis of the liquid leach residue. The use of counter-current leaching method and microwave energy reduces the acid addition to the process.

The process described above applies to the production of industrial grade titanium oxide for use in paint, smelting, and welding industries. The process of this invention can also be used to produce nano-size titanium dioxide. Laboratory test using the 3-litre microwave powered reactor showed that it is possible to dissolve the titanium oxide by using temperature higher than 110 C. After separating the solid leach residue, very fine titanium oxide (nano-size) precipitate is produced by hydrolysis and then lowering the temperature of the liquid to about minus 10 C.

It is advantageous to use high grade titanium oxide feed in producing the nano-size titanium oxide material. Higher strength acid with higher temperature with microwaves is required to dissolve the titanium oxide feed in the leaching process. This is economically possible in a commercial operation when the leaching set-up shown in FIG. 1 is used.

The process of this invention or parts of it may be used to recover additional high grade titanium oxide from the reject of other titanium oxide processes such as the chloride roasting process or to up-grade the titanium oxide produced from processes such as the Tiwest reduction roasting and leaching with ammonium chloride. In the Tiwest process, size reduction and froth flotation of the titanium oxide concentrate will result in higher grade of the titanium oxide product.

BRIEF DESCRIPTION OF THE DRAWINGS

A description of the drawings is given below to further describe the embodiments of the invention.

In the drawings.

DESCRIPTION OF PREFERRED EMBODIMENTS

Figure 1:
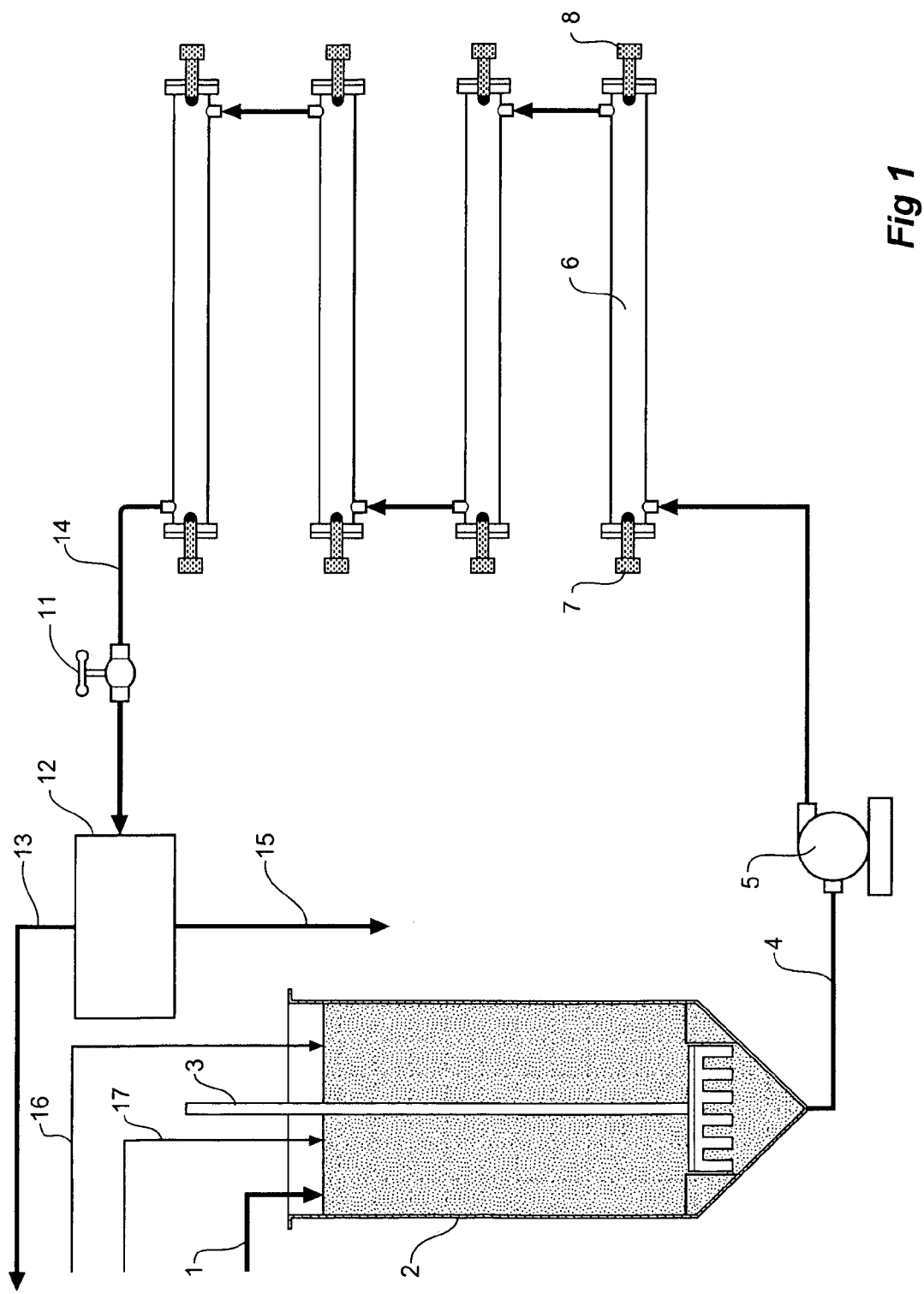
FIG. 1 shows a flow sheet of one embodiment of this invention for a two-stage method of conventional heat and microwave leaching in counter current mode according to this invention.

FIG. 1 is a diagram showing a two-stage method of heat and microwave leaching in counter current mode according to this invention.

Up-graded titanium oxide feed 1 is introduced into the leaching tank 2 fitted with agitator 3 with the liquid 16 from the next leaching stage. The small addition of acid and reagents is shown by 17. Conventional heat or microwave energy is used to maintain the temperature of the leach tank 2 at about 110 C. Readily leachable material is leached in the tank. The slurry 4 is pressurized by pump 5 and delivered to pipe reactor 6 fitted with microwave generator, wave guide, and window 7 and 8 at both ends of the pipe. There may be several pipe reactors connected in series. The discharge of the leach slurry is controlled by the pressure control valve 11 before the slurry is passed to the liquid vortex or wet cyclone 12. If required, slurry 14 is cooled before passing through control valve 11. The liquid 13 is passed on to the prior leaching stage while the solids 15 is passed on to the next leaching stage.

Microwave energy may be applied at the bottom of the leaching tank but the preferred method of applying the microwave in the pipe reactors is shown on FIG. 1 where the slurry is pressurized by a pump to a series of pipes where microwave energy is applied. The pipes may be made of steel or stainless steel coated with plastic such as PTFE. Internal baffles may also be installed in the pipe to ensure mixing of the slurry as it is presented to the microwaves. This preferred method allows higher pressure and temperature to be used during the microwave leaching without overly increasing the cost.

The leaching process may be carried out in two or more stages.

Figure 2:
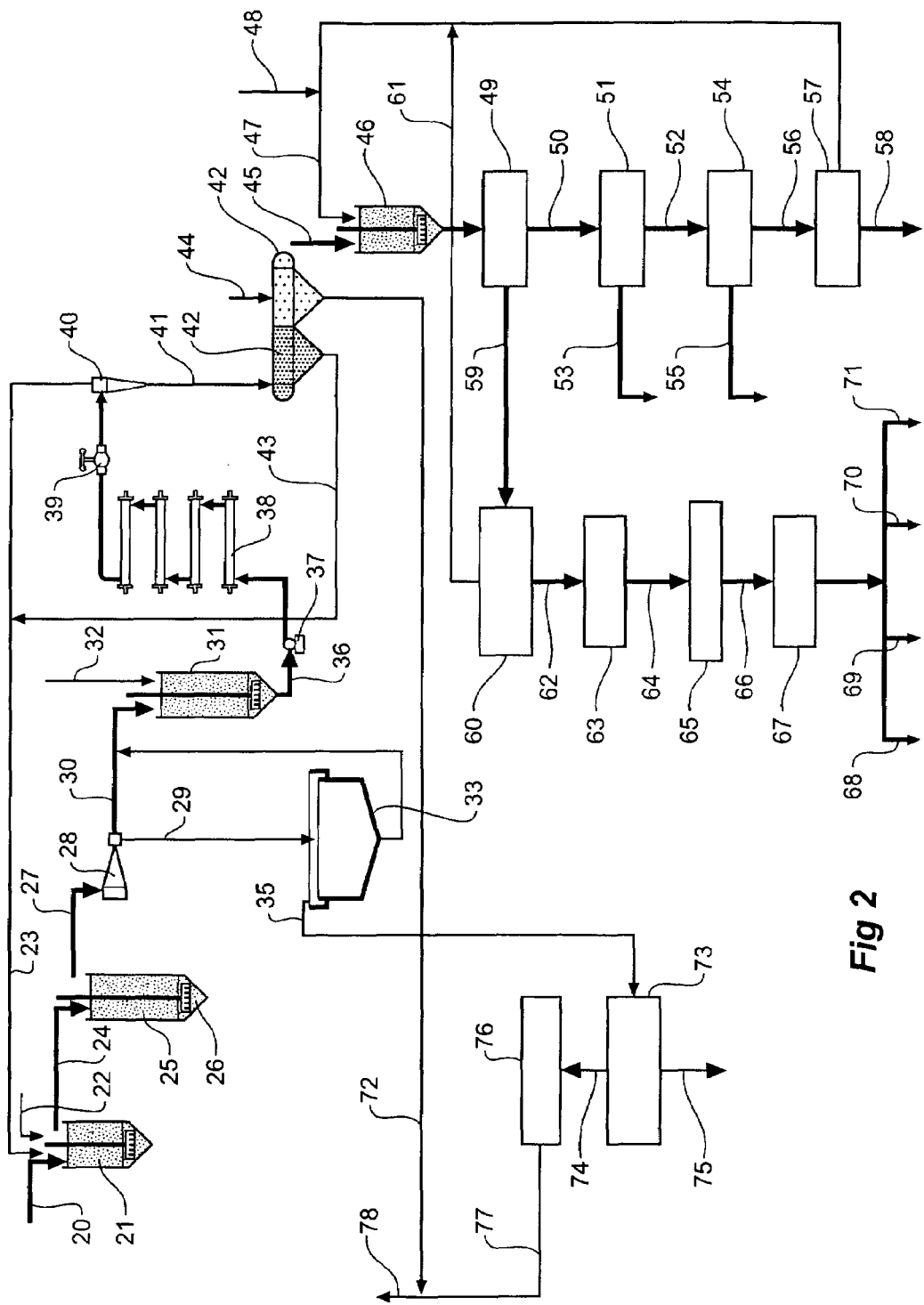
FIG. 2 shows a flow sheet of an embodiment of this invention for the treatment of concentrated ilmenite or up-graded rutile ore.

FIG. 2 is an embodiment of this invention for the treatment of concentrated ilmenite or up-graded rutile ore. Sulfuric acid or hydrochloric acid may be used.

Feed 20 consisting of concentrated ilmenite or up-graded rutile from beach sand or a rutile ore body, is mixed in a tank 21 with recycled liquid 23 and acid/reagents 22. The slurry 24 is then passed on to the first stage leach tank 25 where conventional heat 26 is applied to a temperature of about 110 C to dissolve readily soluble material and utilize the acid as much as possible. The first stage leach slurry 27 is passed to a vortex separator or wet-cyclone 28 where as much of the solids 30 are separated from the liquid 29. There may be several stages of vortex separators. The liquid is passed to a storage tank or thickener 33 prior to acid and oxide recovery. The solid 30 is passed to the second stage leach tank 31 where recycle acid liquor 78 and acid is added 32. The slurry 36 is pressurized by a pump 37 and passed through a series of pipes 38 fitted with wave guides and magnetrons at the ends of the pipes to deliver microwave energy to the slurry. The pipes are internally coated with chemical resistant material such as PTFE and heating coils are installed outside of the pipe to control the temperature. Baffles are also installed inside the pipe to ensure turbulent presentation of the slurry to the microwaves. The treated slurry is passed through a pressure control valve 39 before feeding to a wet cyclone or liquid vortex separator 40. If required, the treated slurry is cooled before passing to the pressure control valve 39. There may be additional leaching stages as required by the particular material being treated.

Some fresh water may be added at this time to precipitate some of the dissolved titanium by hydrolysis. Only a very small amount is precipitated.

The leached slurry is passed through a series of wet cyclone or liquid vortex separators 40 to separate the solids 41 from the liquid 23. The liquid 23 is returned to the previous leaching stage 21 and the solids 41 are fed to a belt filter 42. Liquid 43 from the first section of the belt filter is returned to the previous leach stage 21 while the solids is washed in the next section of the belt filter 42 with wash water 44. Wash solution 72 joins the acid water re-cycle. Washed cake 45 from the second section of the filter is repulped with re-cycle liquid 47 and flotation reagents 48 are added in mixing tank 46. The slurry is then subjected to rougher and cleaner flotation 49 yielding a float concentrate 59 and a flotation tailings 50.

The flotation concentrate 59 is high-grade titanium oxide of 99% plus $TiO_2$ obtained at high recovery and is subjected to liquid-solid separation 60. The liquid 61 is re-cycled to the mixing tank 46 and the solids 62 are calcined 63 and the calcined product 64 is ground in a vortex grinder 65. The ground product 66 is screened 67 to separate paint pigment grade 68, smelter grade 69, welding coating grade 70, and other applications 71.

The flotation tailings 50 are passed through high intensity magnetic separation 51 to recover the chromite 53. The magnetic tailings 52 are subjected to gravity separation 54 to recover heavy minerals including zirconium, gold, and platinum 55. The final tailings 56 containing mostly silica is subjected to liquid solid separation 57 where the liquid 47 is returned to the flotation mixing tank 46 and the solids 58 are delivered to the waste pond.

Primary leach liquor 35 stored in storage thickener 33 is passed to a multi-stage evaporation system 73 where the hydrochloric acid is removed from the leach liquid 35. As acid is removed, the oxides/chlorides of iron, magnesium, calcium, aluminum and sodium 75 are precipitated. If economically desirable, the different oxides may be separated by reducing the temperature in stages to minus 10 C. The by-products, particularly iron oxide, may be sold to consumers after drying and calcining.

The vapour 74 from the multi-stage evaporator is passed to a condenser 76 to recover the acid 77 and re-cycle 78 to the leach process.

The process of this invention may also be used to recover significant amounts of titanium oxide from the residue of other titanium chloride processes in particular the predominant titanium oxide fluidized chlorination process. The tailings from this chlorination process contains fine particles that are rich in fine titanium oxide.

Figure 3:
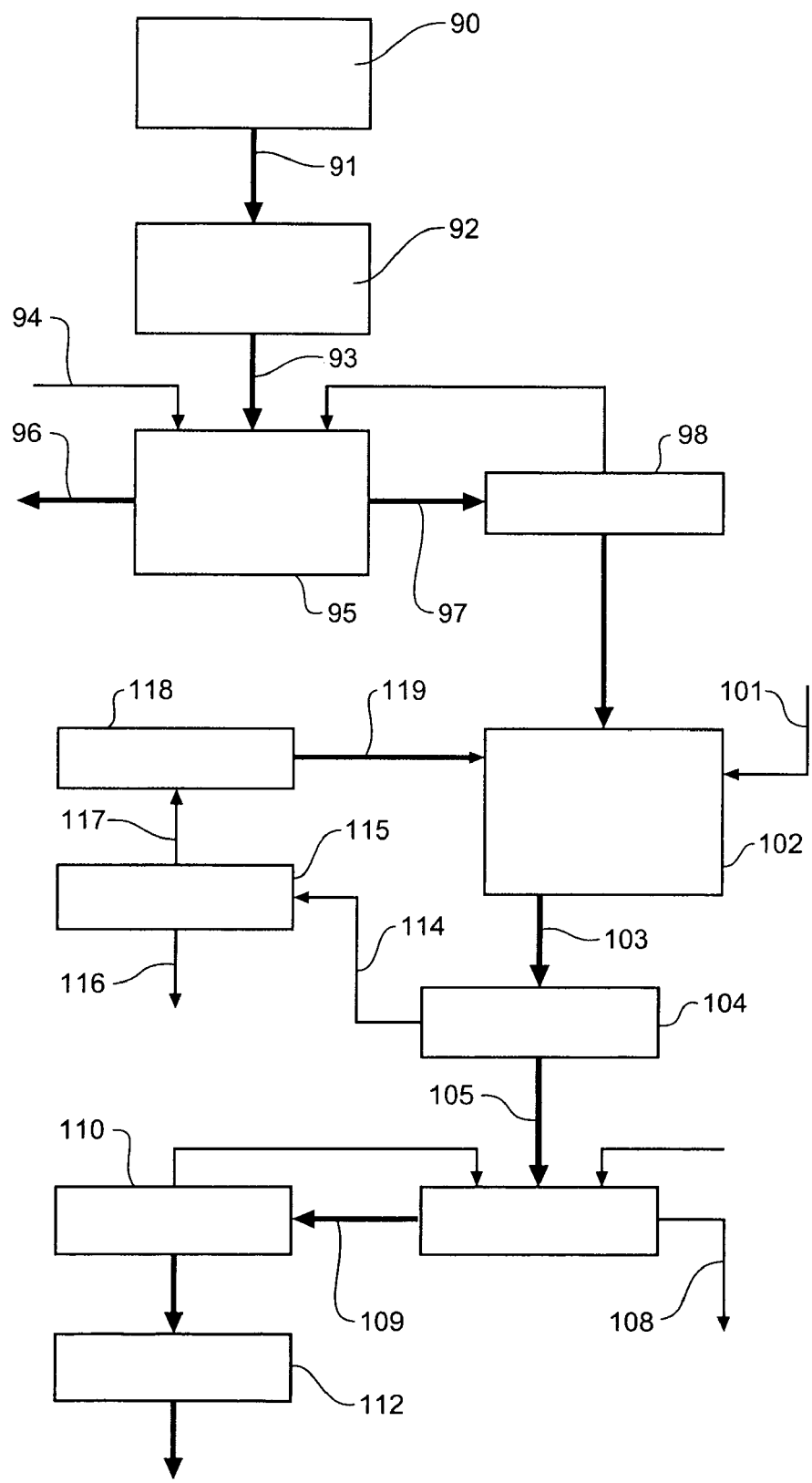
FIG. 3 shows a flow sheet of an embodiment of this invention for a process to recover titanium oxide from chlorination process tails.

The process to recover titanium oxide from the chlorination tails is given in FIG. 3.

Residue 91 is recovered from the tailings pond 90 and subjected to wet or dry grinding 92. Reagents and re-cycled liquid 94 is added before the slurry 93 is subjected to primary flotation and magnetic separation 95 to recover an up-graded titanium oxide concentrate 97. The flotation-magnetic treatment 95 will up-grade the titanium oxide from about 20% to about 60% $TiO_2$. The tailings 96 from the flotation operation-magnetic separation 95 are returned to the tailings waste pond 90.

The titanium oxide flotation-magnetic concentrate 97 is subjected to liquid solid separation 98 using vortex separators and filtration before leaching with acid in a counter-current microwave assisted leaching 102 with hydrochloric acid 101 added as described in FIG. 1. The leach slurry 103 is subjected to liquid-solid separation and filtering and washing 104. The washed solid residue 105 is subjected to flotation separation to produce a high grade titanium dioxide concentrate 109 and a waste residue 108 that is delivered to the waste pond.

The high grade titanium dioxide concentrate 109 is subjected to liquid solid separation 110 before calcining 112 to produce a high grade titanium oxide product.

The liquid 114 from the leach process is passed to the multi-stage evaporation system 115 where oxides/chlorides are precipitated and the acid vapor 117 is produced. The oxides/chlorides 116 are returned to the waste tailings pond while the evaporated fumes 117 are passed to a condenser 118 to recover the acid 119 for re-cycle to the leaching process.

The claims defining the invention are as follows:

1. A process for extracting and producing a high-grade titanium oxide from a titanium compound comprising
   a) leaching a leach slurry comprising the titanium compound using a leachant and energy to produce a solid leach residue and a liquid leach residue; and b) subjecting the solid leach residue to flotation to recover a high grade titanium oxide concentrate, wherein microwave energy is applied to the leaching with a leach temperature at a maximum of about 110° C. and the microwave energy is applied to the leach slurry as it is passed through a series of pipes fitted with microwave generators.

2. A process as in claim 1 wherein the leachant is an acid and an oxidant.

3. A process as in claim 2 further including the step of processing the liquid leach residue to recover the acid.

4. A process as in claim 1 wherein the titanium compound is ground fine to about 20 microns.

5. A process as in claim 2 wherein the acid used for leaching is an acid selected from the group consisting of sulfuric acid, nitric acid and hydrochloric acid.

6. A process as in claim 2 wherein the acid is sulfuric acid and is used in a concentration of 30 to 60% w/w.

7. A process as in claim 2 wherein the acid is hydrochloric acid and is used in a concentration of 10 to 30% w/w.

8. A process as in claim 2 wherein the oxidant is hydrogen peroxide.

9. A process as in claim 1 wherein conventional heat energy is applied to the leaching step to maintain a leaching temperature up to 110° C.

10. A process as in claim 1 wherein the leaching step is carried out as a counter current process.

11. A process as in claim 1 where the solid leach residue is separated from the liquid leach residue and washed.

12. A process as in claim 11 wherein the washed solid leach residue is mixed with re-cycled liquid and the pH adjusted to between 8 and 10 with soda ash or lime.

13. A process as in claim 1 wherein flotation frother and collector reagents are mixed with the solid leach residue in the flotation step.

14. A process as in claim 1 wherein the flotation is performed using a concentrate that is high grade titanium oxide and flotation tailings that are insolubles.

15. A process as in claim 14 wherein the flotation concentrate is subjected to liquid-solid separation, calcining, size reduction and screening to produce various grades of titanium oxide products.

16. A process as in claim 14 where the flotation tailings are subjected to magnetic and gravity separation to extract by-products including chromite, zirconia and precious metals such as gold or platinum.

17. A process as in claim 1 wherein the titanium oxide contains vanadium and comprising a first step of oxidation or reduction roasting.

18. A process as in claim 17 wherein a pre-leach with acid and hydrogen peroxide is carried out on the titanium compound to extract vanadium.

19. A process as in claim 1 wherein the solid leach residue is subjected to cyanide or electro-leaching to recover precious metals such as platinum.

20. A process as in claim 3 wherein the acid is hydrochloric acid and the liquid leach residue is subjected to a multi-stage evaporation to recover the hydrochloric acid.

21. A process as in claim 3 wherein the acid is sulfuric acid and the sulfuric acid is recovered by pyrolysis of the liquid leach residue.

22. A process for producing highly pure nano size titanium oxide from a titanium compound comprising the following steps:
   (i) leaching of the titanium compound with an acid and an oxidant using microwave energy;
   (ii) subjecting leach residue to liquid-solid separation to produce a solid leach residue and a liquid leach residue; and
   (iii) subjecting the liquid leach residue to hydrolysis to produce nano-size titanium oxide; and
   processing the liquid leach residue to recover the acid.

23. A process as in claim 22 wherein the acid is sulfuric acid and is used in a concentration of about 30 to 60% w/w.

24. A process as in claim 22 wherein the acid is hydrochloric acid and is used in a concentration of about 10 to 30% w/w.

* * * * *